United States Patent [19]

Johnson

[11] 4,132,245

[45] Jan. 2, 1979

[54] EXTERNAL CENTERING SPRING ADJUSTMENT FOR A SPOOL VALVE

[75] Inventor: Howard L. Johnson, Joliet, Ill.

[73] Assignee: Caterpillar Tractor Co., Peoria, Ill.

[21] Appl. No.: 760,069

[22] Filed: Jan. 17, 1977

[51] Int. Cl.[2] .................... F16K 27/08; F16K 11/07; F15B 13/042

[52] U.S. Cl. .............................. 137/377; 137/625.63; 137/625.66

[58] Field of Search ........... 137/625.6, 625.61, 625.62, 137/625.63, 625.64, 625.69, 505.41, 505.42, 377, 382; 251/321, 337, 31, 89, 90, 92; 267/174, 175, 176

[56] References Cited

U.S. PATENT DOCUMENTS

| | | | |
|---|---|---|---|
| 304,271 | 8/1884 | Lunkenheimer | 137/377 |
| 3,084,710 | 4/1963 | Gondek | 251/337 |
| 3,473,566 | 10/1969 | Peppel | 137/625.69 |
| 3,749,128 | 7/1973 | Sallberg et al. | 137/625.61 |
| 3,773,083 | 11/1973 | Hagve et al. | 137/625.69 |

*Primary Examiner*—Martin P. Schwadron
*Assistant Examiner*—A. Michael Chambers
*Attorney, Agent, or Firm*—Wegner, Stellman, McCord, Wiles & Wood

[57] ABSTRACT

A pilot-operated spool valve including a valve body, a bore in the body, ports in the body and extending to the bore, a spool in the bore and axially shiftable therein, at least one pilot associated with an end of the spool for applying a shifting force to the spool, at least one spring in the body for applying a biasing force to the spool, and an adjustment for the biasing spring including a rotatable and axially movable member received in the body and engaging the spring, a cam surface in the form of interengaging threads on the member and the body for axially moving the member in response to rotation thereof, a rotatable actuator for rotating the member, a mount for the actuator so that the actuator can rotate only and is restrained against axial movement, and an axially extendable connection between the actuator and the member.

4 Claims, 3 Drawing Figures

EXTERNAL CENTERING SPRING ADJUSTMENT FOR A SPOOL VALVE

BACKGROUND OF THE INVENTION

This invention relates to valves and, more particularly, to pilot-operated spool valves of the type frequently utilized in controlling the flow of hydraulic fluid to the hydraulic motors driving the tracks on crawler-type vehicles.

Increasingly, crawler-type vehicles are being constructed with hydraulic motors for providing propulsion. Typically, one hydraulic motor will be provided for each track and the flow of hydraulic fluid to each motor is individually controlled to provide turning movements, etc., by varying the speed and/or direction of movement of one track with respect to the other.

However, since the propulsion systems for the different tracks are completely independent, a problem attends their use if there is mismatching of the corresponding components. In such a case, for identical positions of the controls for each of the tracks, the vehicle will not travel in a straight line due to more resistance in one system than in the other, which resistance may be either hydraulic or mechanical, or both.

Frequently, the problem is minimal when maximum hydraulic pressure is applied to both propulsion systems. However, there are many uses of such vehicles wherein the maximum speed is seldom used. Rather, lesser speeds are more frequently used with the result that the mismatching will cause the above mentioned difficulty.

It is, of course, impossible at the time of manufacture to know whether the vehicle will be principally utilized at maximum speed or at some lesser speed so that an adjustment to the system can be made at that time. Thus, adjustments frequently must be made in the field, requiring the presence of trained personnel and the attendant expense.

SUMMARY OF THE INVENTION

The present invention is directed to overcoming one or more of the above problems.

According to the invention, there is provided an adjustable, pilot-operated spool valve including a valve body, a bore in the body, ports in the body and extending to the bore, a spool in the bore and axially shiftable therein, means defining at least one pilot associated with an end of the spool for applying a shifting force to the spool, biasing means in the body for applying a biasing force to the spool, and means for adjusting the biasing means comprising a rotatable and axially shiftable member received in the body and engaging the biasing means, cam means on the member and the body for axially moving the member in response to rotation thereof, a rotatable actuator for rotating the member, means mounting the actuator for rotation and restraining the actuator against axial movement, and an axially extendable connection between the actuator and the member whereby the biasing force may be easily adjusted.

Other objects and advantages will become apparent from the following specification taken in connection with the accompanying drawings.

DESCRIPTION OF THE PREFERRED EMBODIMENT

Figure 1:
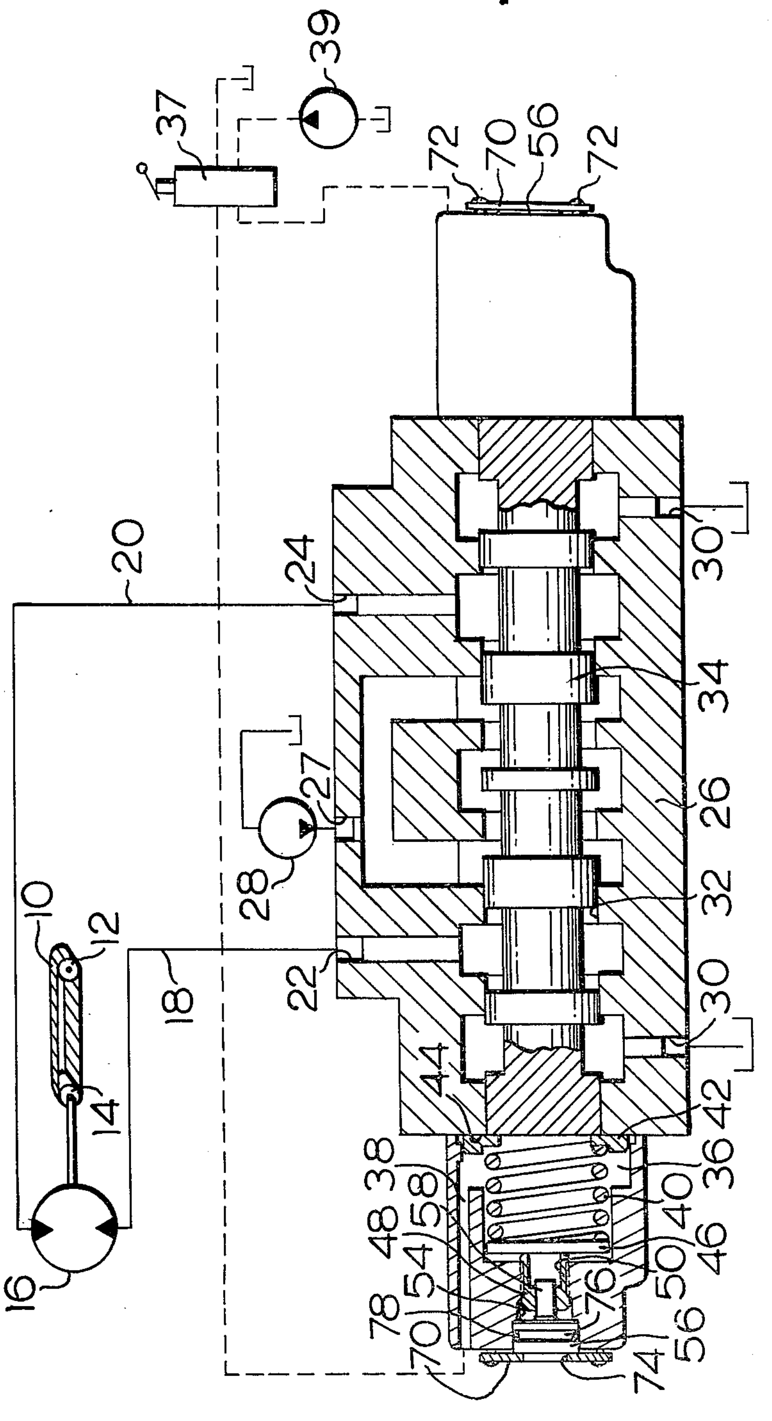
FIG. 1 is a schematic of a part of a track laying vehicle utilizing a valve made according to the invention with the valve shown partly in section for clarity.

An exemplary embodiment of the invention is illustrated in the drawings and with reference to FIG. 1 is seen to be utilized as part of the propulsion system of a track laying vehicle. Specifically, an endless track 10 is trained about sprockets 12 and 14 secured to the vehicle frame (not shown) and the sprocket 14 is driven by the output of a hydraulic motor 16, also secured on the frame.

The motor 16 is bidirectional and there are provided conduits 18 and 20 extending to ports 22 and 24, respectively, in a spool valve body 26. The valve body 26 includes a supply port 27 connected to a hydraulic pump 28 and a pair of reservoir ports 30 connected to the reservoir for the pump 28.

Interiorly of the body 26 is an elongated bore 32 which receives an axially shiftable spool 34. The spool 34 and the bore 32 are provided with the lands and grooves illustrated and the body 26 is similarly provided with the internal conduits illustrated. Those skilled in the art will recognize that the spool 34 is illustrated as being in a neutral position whereat pressurized fluid from the pump 28 is directed to neither of the conduits 18 and 20. Shifting of the spool 34 to the right as viewed in FIG. 1 will cause pressurized fluid to be directed to the motor 16 through the conduit 18 to cause one direction of movement of the track 10, while at the same time, the conduit 20 will be connected to the reservoir. For a shift of the spool 34 to the left from the position illustrated in FIG. 1, the reverse will occur.

At each end of the spool 34, and within the valve body 26, there is provided a pilot chamber 36 having a pilot port 38 connected to a manually operable control valve 37 which may be operated to connect one or the other of the chambers 36 to a low pressure hydraulic pump 39 and the other to reservoir, or vice versa. The application of pilot pressure to one or the other of the chambers 36 will result in the application of a shifting force to the associated end of the spool 34, as is well known.

Within each of the chambers 36 is a biasing means in the form of a coil spring 40. The spring 40 has an end adjacent the associated end of the spool 34 which abuts against a washer 42 which overlies a flange 44 about the end of the bore 32 as well as the end of the spool 34. As a consequence, when the spool 34 is centered as illustrated, no biasing force will be aplied to the spool 34 by the spring 40, the force being applied only to the flange 44. However, if the spool is shifted to the left, the left-hand spring 40 will apply a biasing or centering force to the spool. Conversely, if the spool 34 is shifted to the right, the right-hand spring 40 will similarly apply a biasing force.

The end of the spring 40 opposite from the washer 42 abuts against a plate 46 within the chamber 36. The plate 46 is abutted against a rotatable and axially shiftable member 48 which is received in a threaded bore 50 opening to the interior of the chamber 36 and generally coaxial with the bore 32.

Figure 2:
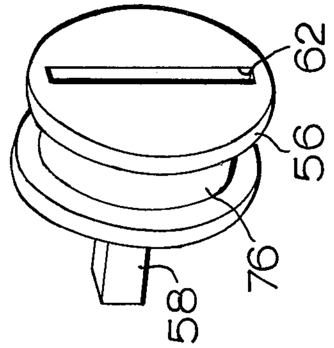
FIG. 2 is a perspective view of a part of the bias adjustment mechanism made according to the invention.
Figure 3:
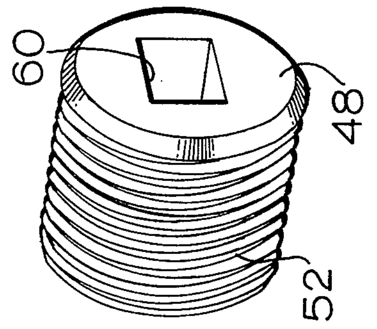
FIG. 3 is a perspective view of another part of the adjustment mechanism.

As best seen in FIG. 3, the exterior of the member 48 is threaded as at 52 and is threadably received in the bore 50. Thus, the interengaging threads act as cams so that the member 48 will shift axially within the bore 50 in response to rotation thereof. The axial shifting will vary the position of the plate 46 and thus the degree of compression of the spring 40 to vary the biasing force applied by the spring to the associated end of the spool 34.

An enlarged, stepped bore 54 is coaxial with the bore 50 and extends to the exterior of the valve body 26. A rotatable actuator 56 is disposed within the stepped bore 54. The actuator 56 is cylindrical in configuration and the step in the bore 54 restrains the actuator 56 against axial movement therein while allowing rotation thereof.

A projection 58, square in cross section, extends from one end of the actuator 56 toward the member 48 to be received in an axial opening 60 therein to define an axially extendable, splined connection between the actuator 56 and the member 48. The end of the actuator 56 opposite from the projection 58 includes a tool receiving formation in the form of a slot 62 for receipt of a screwdriver or the like and the dimension of the actuator 56 is such that it extends slightly outwardly of the body 26 from the stepped bore as seen in FIG. 1.

A plate 70 is mounted on the body 26 by means of screws 72 and includes an opening 74 aligned with the slot 62. The opening 74 has a lesser dimension than that of the actuator so as to cause the plate 70 to bear against the outer periphery of the end of the actuator 56 having the slot 62 therein.

The actuator 56 includes an annular groove 76 in its cylindrical surface and an O-ring seal 78 is disposed therein to sealingly engage the stepped bore 54.

The biasing force applied to the spool 34 at either end thereof may be easily adjusted so as to set system characteristics sufficient to allow straight line movement of the vehicle in the field by the operator thereof. The procedure is as follows. Screws 72 are loosened and a screwdriver inserted through the opening 74 into the slot 62. The actuator 56 may then be rotated and, by reason of the spline connection to the member 48, the latter will rotate within the bore 50 and will axially shift therein in response to such rotation thereby shifting the position of the plate 46 and changing the degree of compression of the spring 40. Once the desired adjustment is achieved, the screws 72 may then be tightened so that the plate 70 applied a clamping force against the actuator 56 to tightly clamp the same against the step in the stepped bore 54 to prevent inadvertent rotation thereof. Thus, the adjustment is set.

Suitable adjustments may be made at both ends of the valve as required.

It will be particularly noted that the actuator is clamped in any position of adjustment by a clamping force which is strictly axial in nature. That is, the clamping force has no rotative components which would tend to rotate the actuator 56 during the clamping process and cause a change in position of the member 48. Thus, the adjustment and retention thereof are positive in nature.

It will be appreciated that access to the adjustment mechanism is easily had and the adjustment procedure sufficiently simple so as to be capable of being performed by the operator of the vehicle in the field without the need for trained personnel. It will also be recognized that by reason of such a provision, the operator may easily adjust the system, even on a day-to-day basis, if the nature of the work being performed on a given day varies from the previous day, to thereby avoid the problems of attaining straight line operation of the vehicle for identical control settings for each track for the speed to be used predominantly on a given job.

The embodiments of the invention in which an exclusive property or privilege is claimed are defined as follows:

1. A pilot-operated spool valve comprising:
- a valve body;
- a bore in said body;
- ports in said body and extending to said bore;
- a spool in said bore and axially shiftable therein;
- means defining at least one pilot associated with an end of said spool for applying a shifting force to said spool;
- biasing means in said body for applying a biasing force to said spool;
- means for adjusting the biasing means comprising a rotatable and axially movable member received in said body and engaging said biasing means, cam means on said member and said body for axially moving said member in response to rotation thereof, a rotatable actuator for rotating said member, means mounting said actuator only for rotation and restraining said actuator against axial movement, and an axially extendable connection between said actuator and said member; and
- a nonrotatable, axially movable clamp means for clamping said actuator in a desired position of rotary adjustment including a plate abutting said actuator, said plate being non rotatable during adjustment of said biasing means.

2. A pilot-operated spool valve comprising:
- a valve body;
- a bore in said body;
- ports in said body and extending to said bore;
- a spool in said bore and axially shiftable therein;
- means defining at least one pilot associated with an end of said spool for applying a shifting force to said spool;
- biasing means in said body for applying a biasing force to said spool;
- means for adjusting the biasing means comprising a rotatable and axially movable member received in said body and engaging said biasing means, cam means on said member and said body for axially moving said member in response to rotation thereof, a rotatable actuator for rotating said member, means mounting said actuator only for rotation and restraining said actuator against axial movement, and an axially extendable connection between said actuator and said member;
- a nonrotatable, axially movable clamp means for clamping said actuator in a desired position of rotatary adjustment;
- said actuator being provided with a tool receiving formation remote from said member and said clamp means comprising a plate abutting said actuator and having an access opening aligned with said formation.

3. The valve of claim 2 wherein said access opening has a lesser dimension than that of the actuator so that said plate bears against the outer periphery of the end of said actuator.

4. The valve of claim 2 wherein said actuator is received in a bore in said body and extends slightly outwardly of said body, said bore being stepped so that said actuator is clamped by the step of said bore and said plate.

* * * * *